Dec. 22, 1936.  H. A. YEIDER  2,064,868
GRAPHOPHONE OR SOUND REPRODUCING INSTRUMENT
Filed Sept. 18, 1930  14 Sheets-Sheet 1
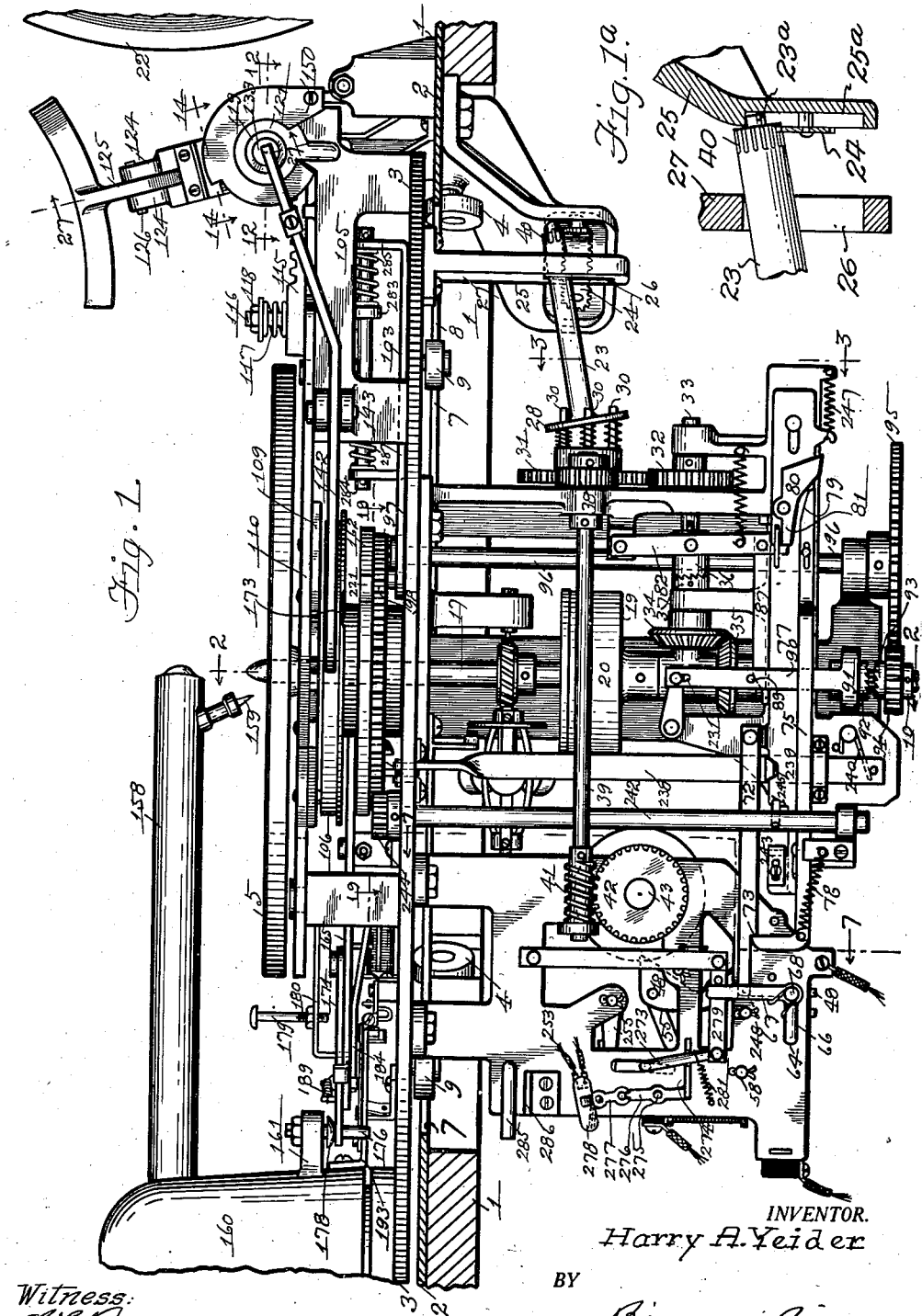
INVENTOR.
Harry A. Yeider
BY
Rice and Rice
ATTORNEYS.

Dec. 22, 1936.　　　　H. A. YEIDER　　　　2,064,868
GRAPHOPHONE OR SOUND REPRODUCING INSTRUMENT
Filed Sept. 18, 1930　　　14 Sheets-Sheet 2
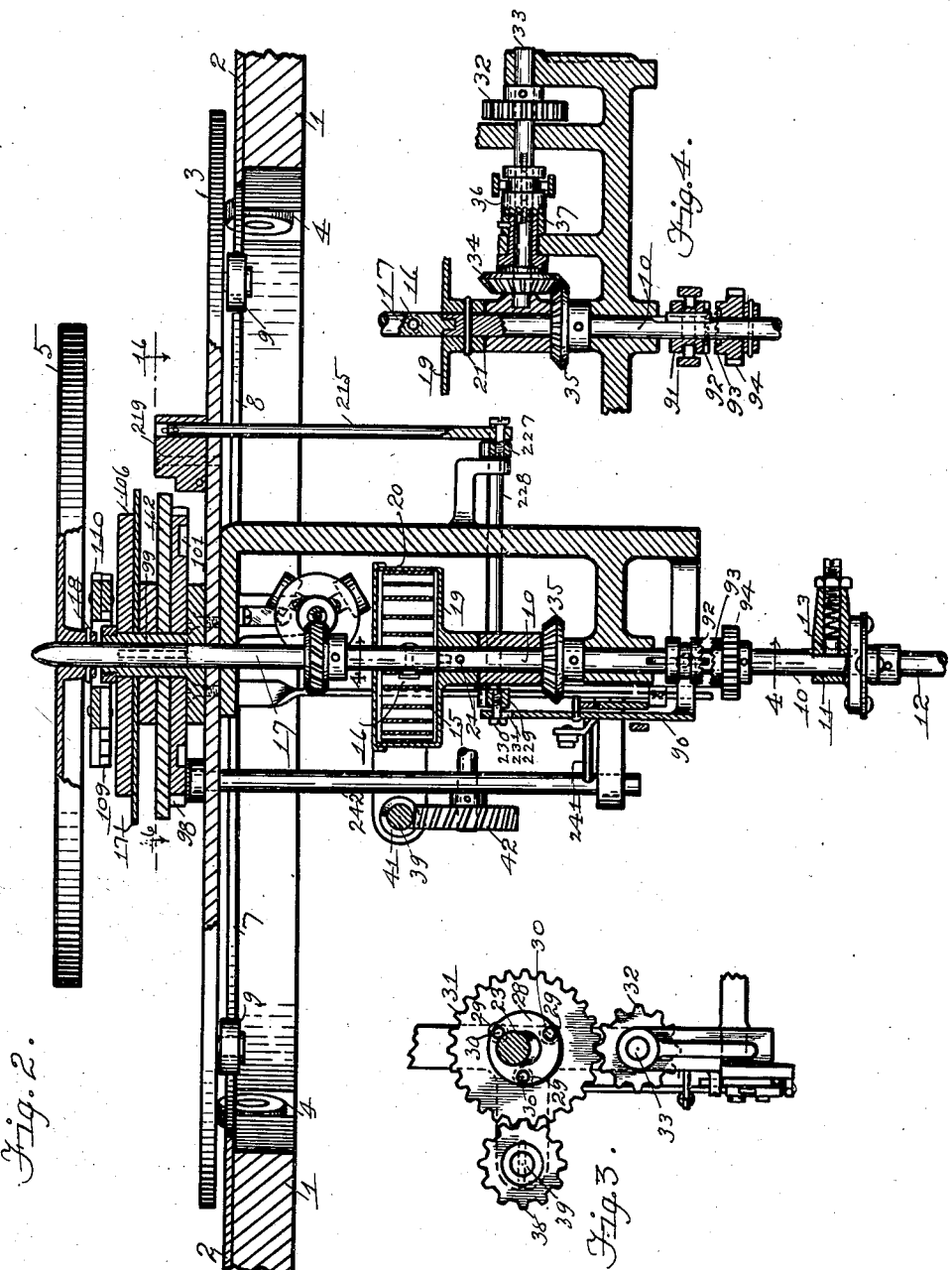
INVENTOR
Harry A. Yeider
BY
Rice and Rice
ATTORNEYS.

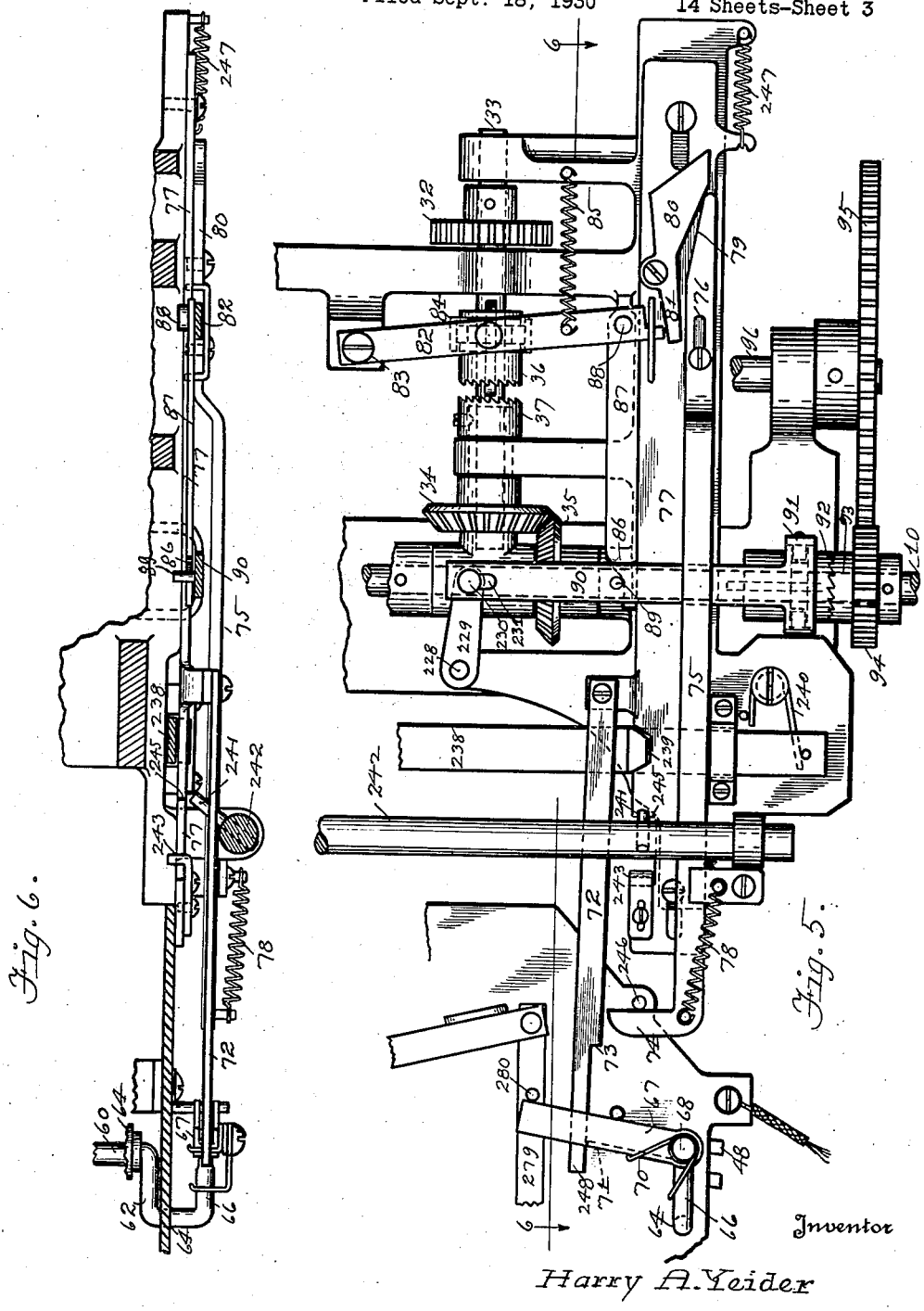

Dec. 22, 1936.   H. A. YEIDER   2,064,868
GRAPHOPHONE OR SOUND REPRODUCING INSTRUMENT
Filed Sept. 18, 1930   14 Sheets-Sheet 4
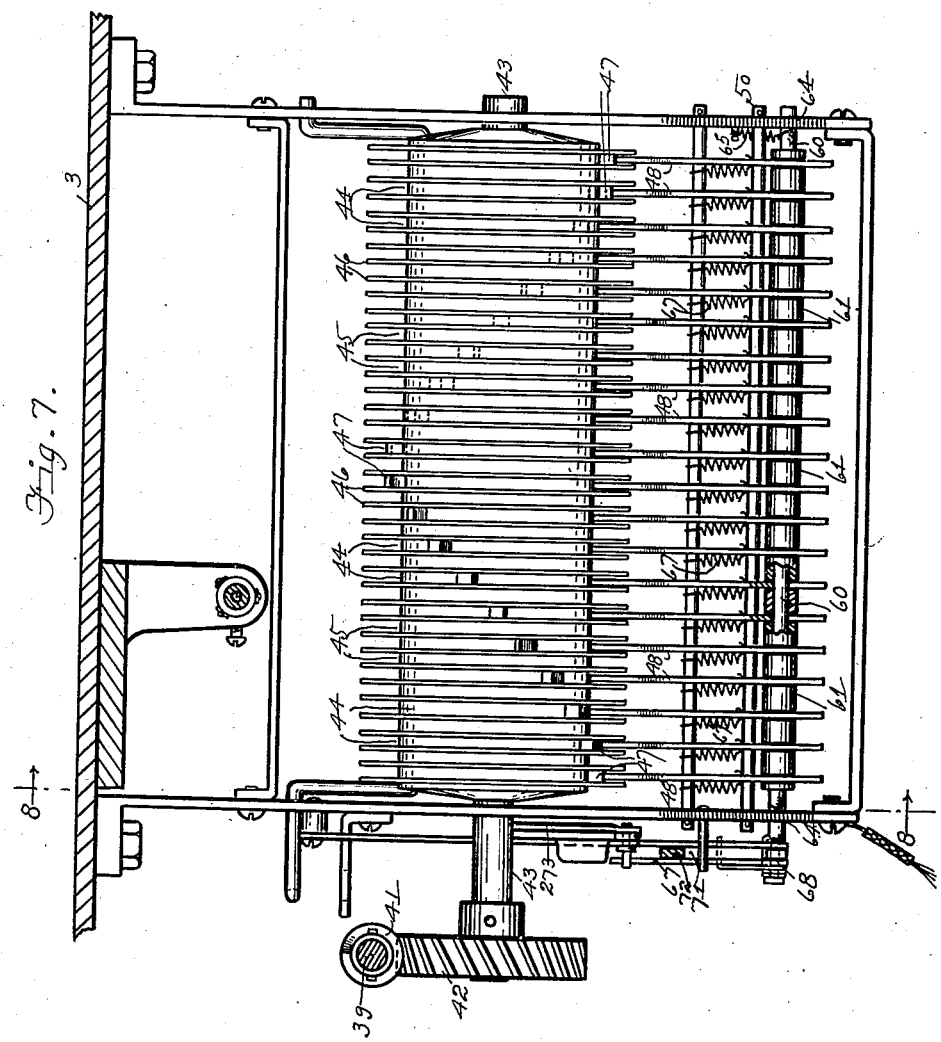
Inventor
Harry A. Yeider
Witness:
By Rice and Rice
Attorneys Dec. 22, 1936.  H. A. YEIDER  2,064,868
GRAPHOPHONE OR SOUND REPRODUCING INSTRUMENT
Filed Sept. 18, 1930   14 Sheets-Sheet 5
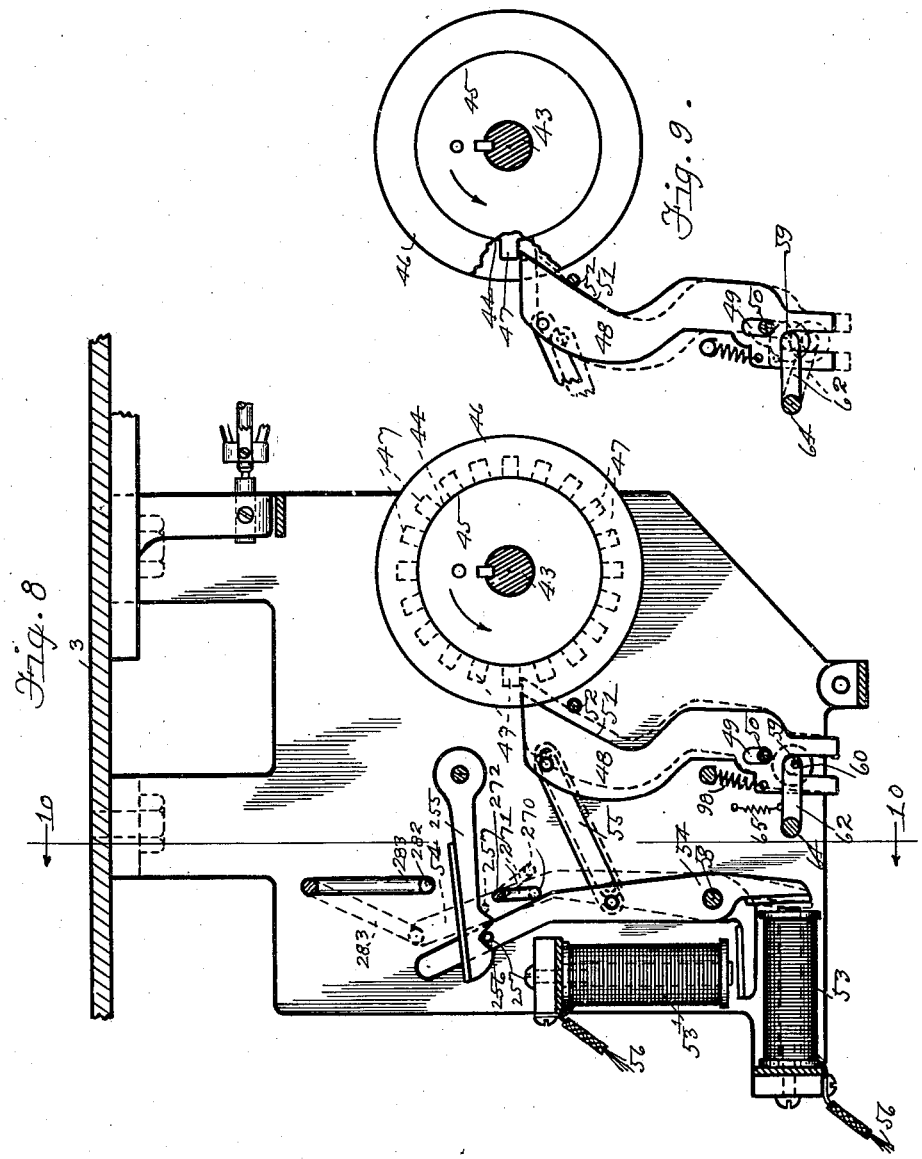
INVENTOR.
Harry A. Yeider
BY
Rice and Rice
ATTORNEYS.

Dec. 22, 1936.  H. A. YEIDER  2,064,868
GRAPHOPHONE OR SOUND REPRODUCING INSTRUMENT
Filed Sept. 18, 1930  14 Sheets—Sheet 6
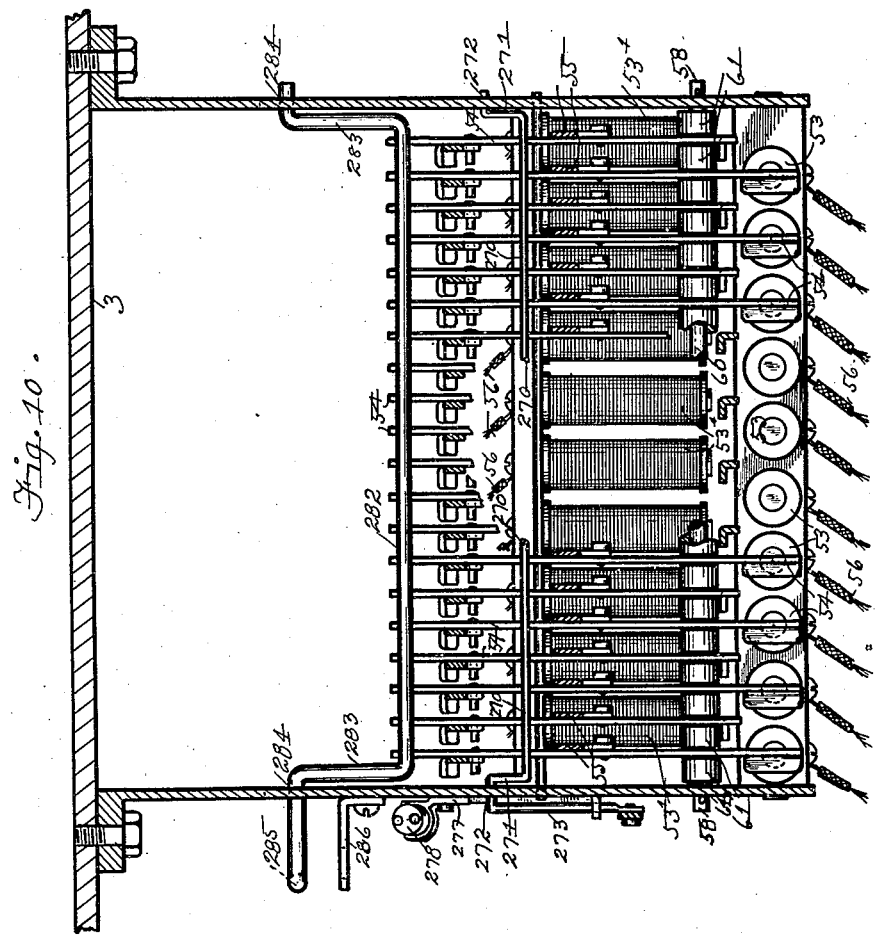
Inventor
*Harry A. Yeider*
Witness:
By *Rice and Rice*
Attorneys Dec. 22, 1936.  H. A. YEIDER  2,064,868
GRAPHOPHONE OR SOUND REPRODUCING INSTRUMENT
Filed Sept. 18, 1930  14 Sheets-Sheet 7

INVENTOR.
Harry A. Yeider
BY
Rice and Rice
ATTORNEYS.

Witness:

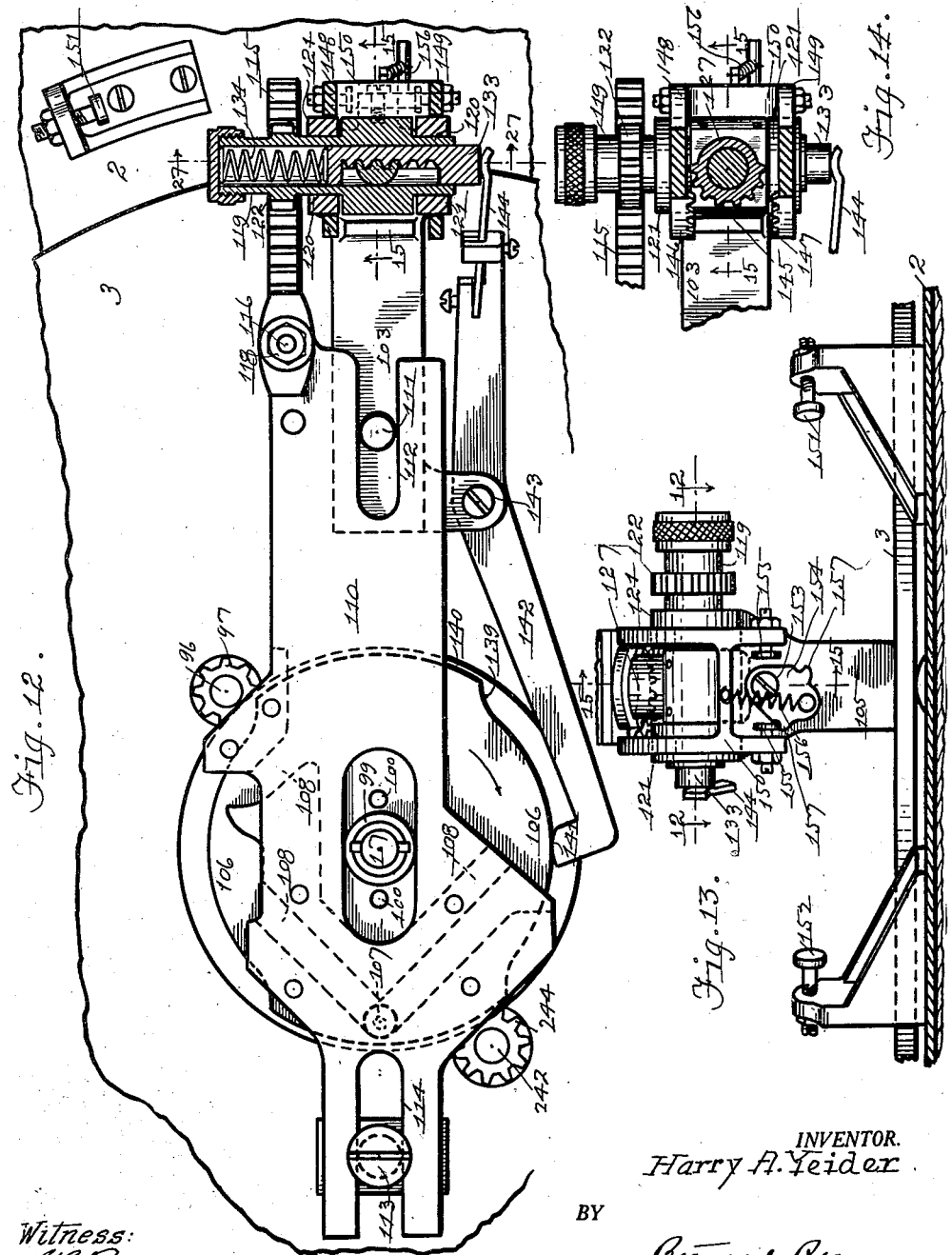

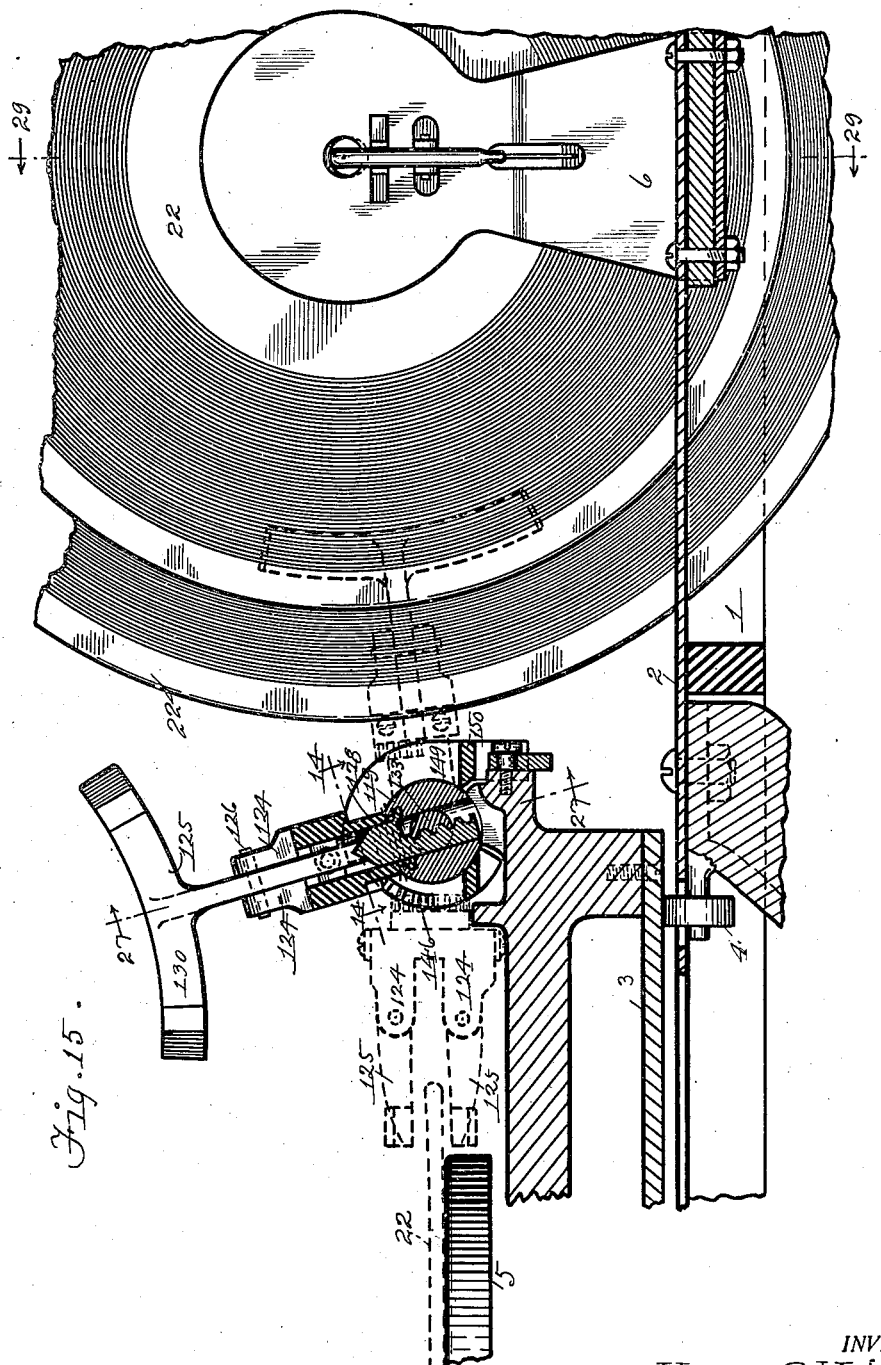

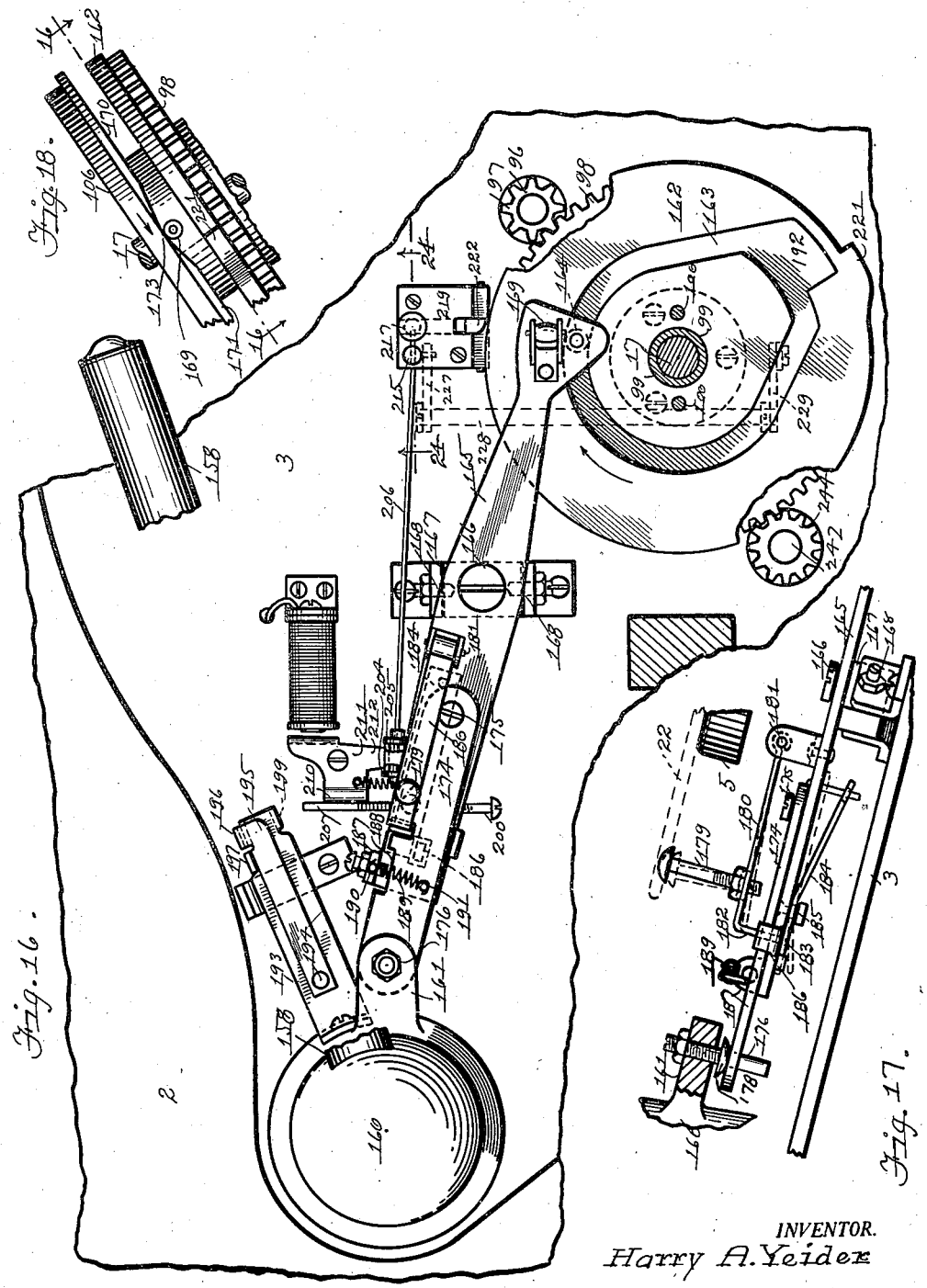

Dec. 22, 1936.  H. A. YEIDER  2,064,868
GRAPHOPHONE OR SOUND REPRODUCING INSTRUMENT
Filed Sept. 18, 1930  14 Sheets-Sheet 11
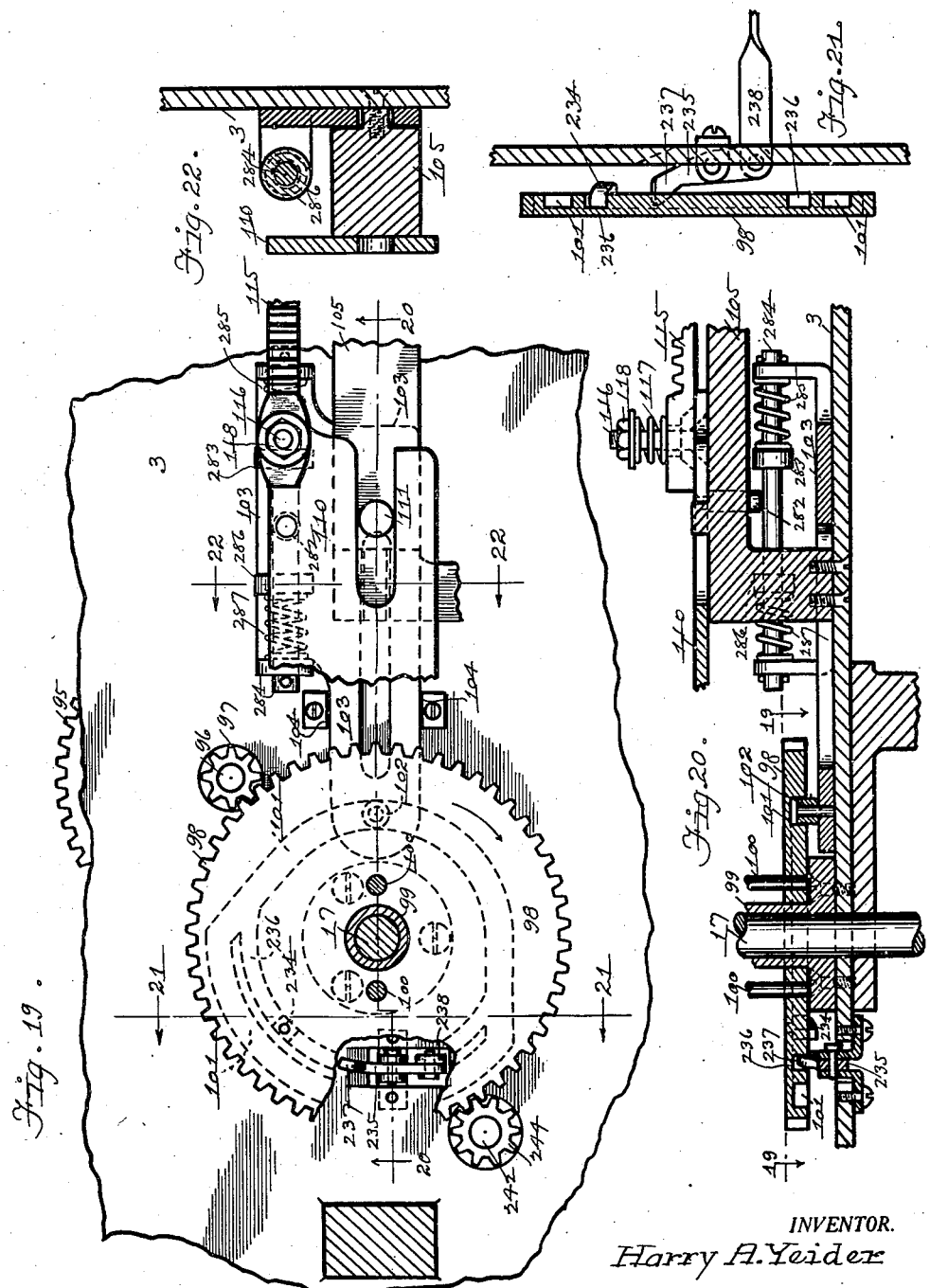
INVENTOR.
Harry A. Yeider
BY
Rice and Rice
ATTORNEYS.

Dec. 22, 1936.  H. A. YEIDER  2,064,868
GRAPHOPHONE OR SOUND REPRODUCING INSTRUMENT
Filed Sept. 18, 1930  14 Sheets-Sheet 12
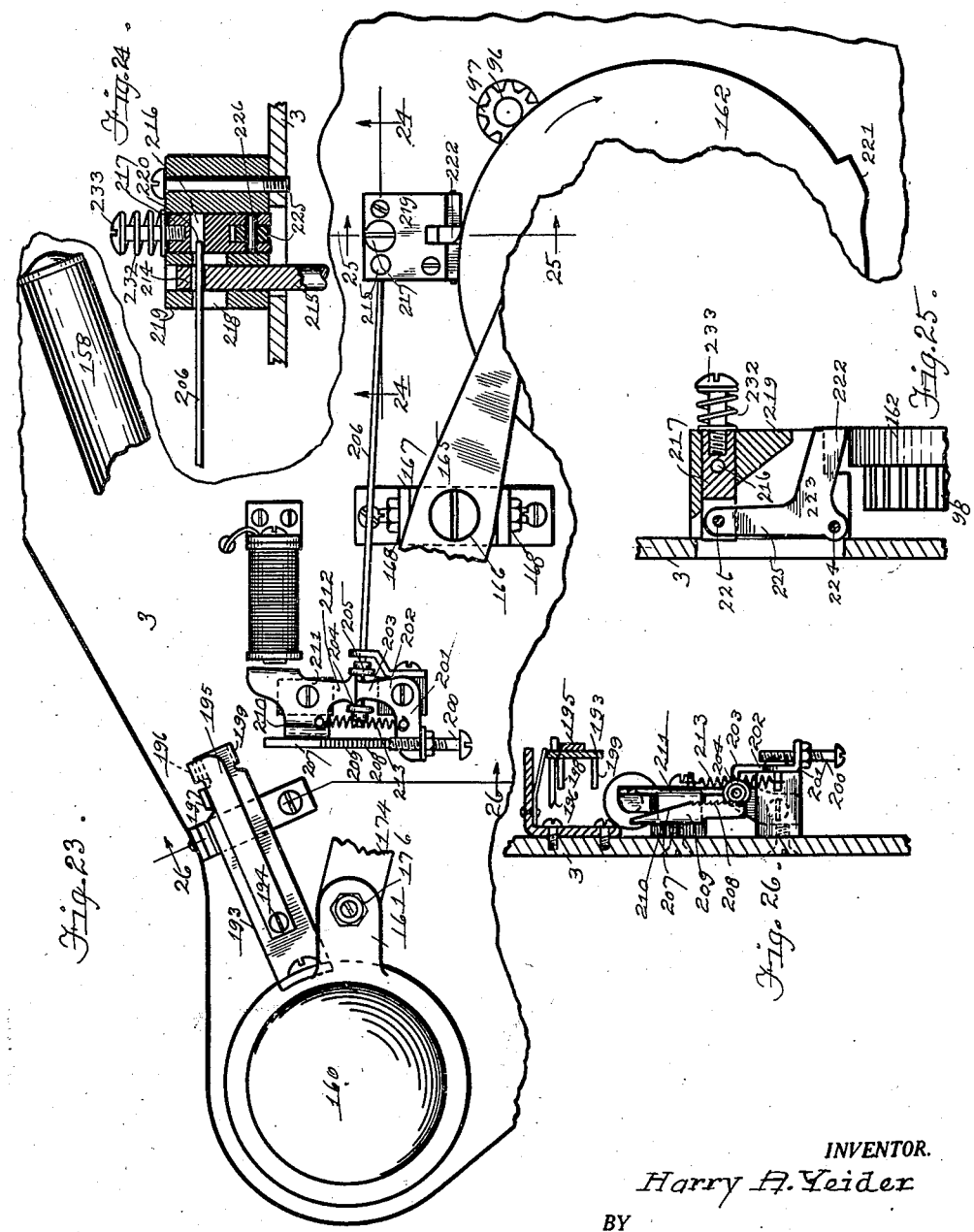
INVENTOR.
Harry A. Yeider
BY
Rice and Rice
ATTORNEYS.

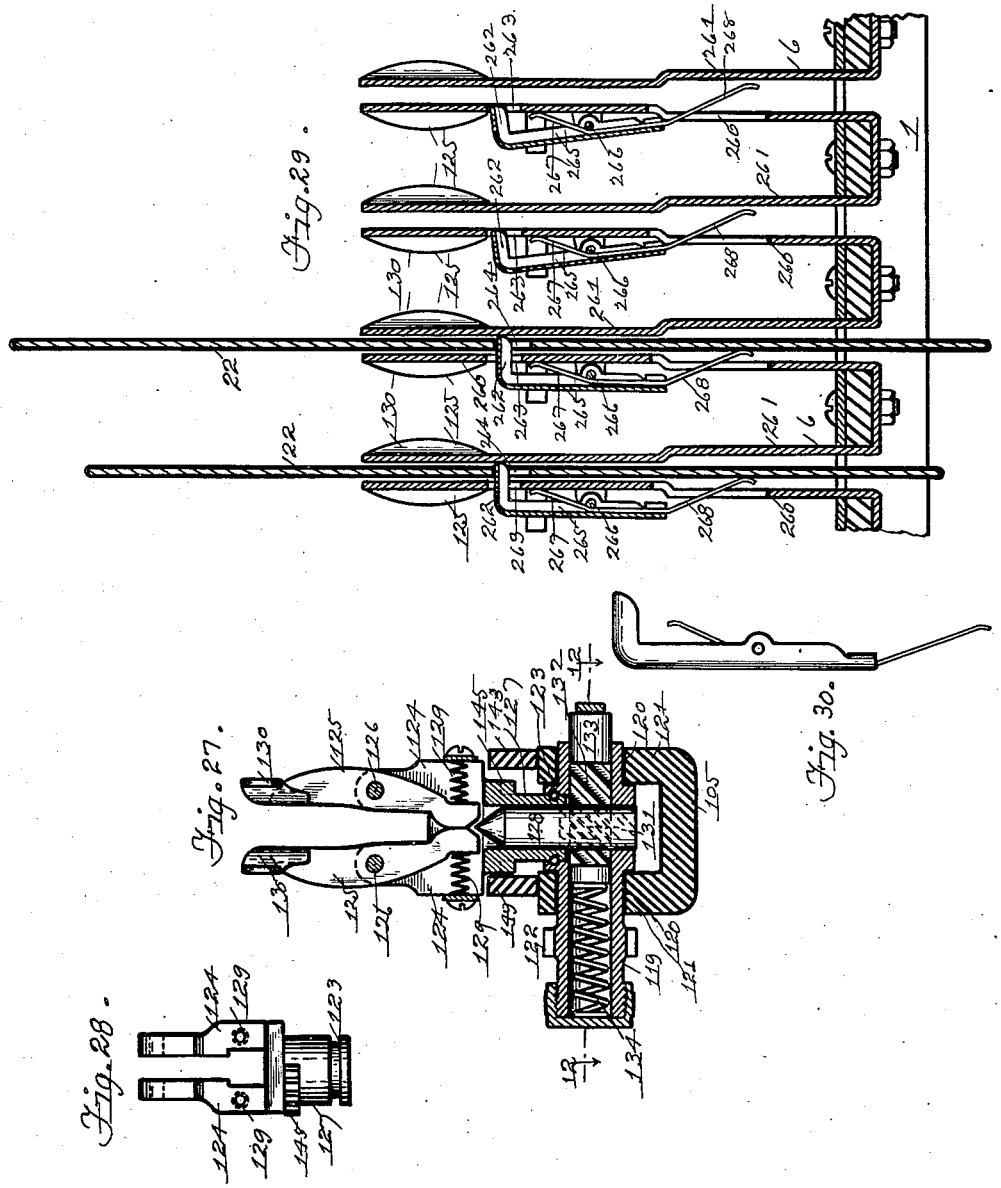

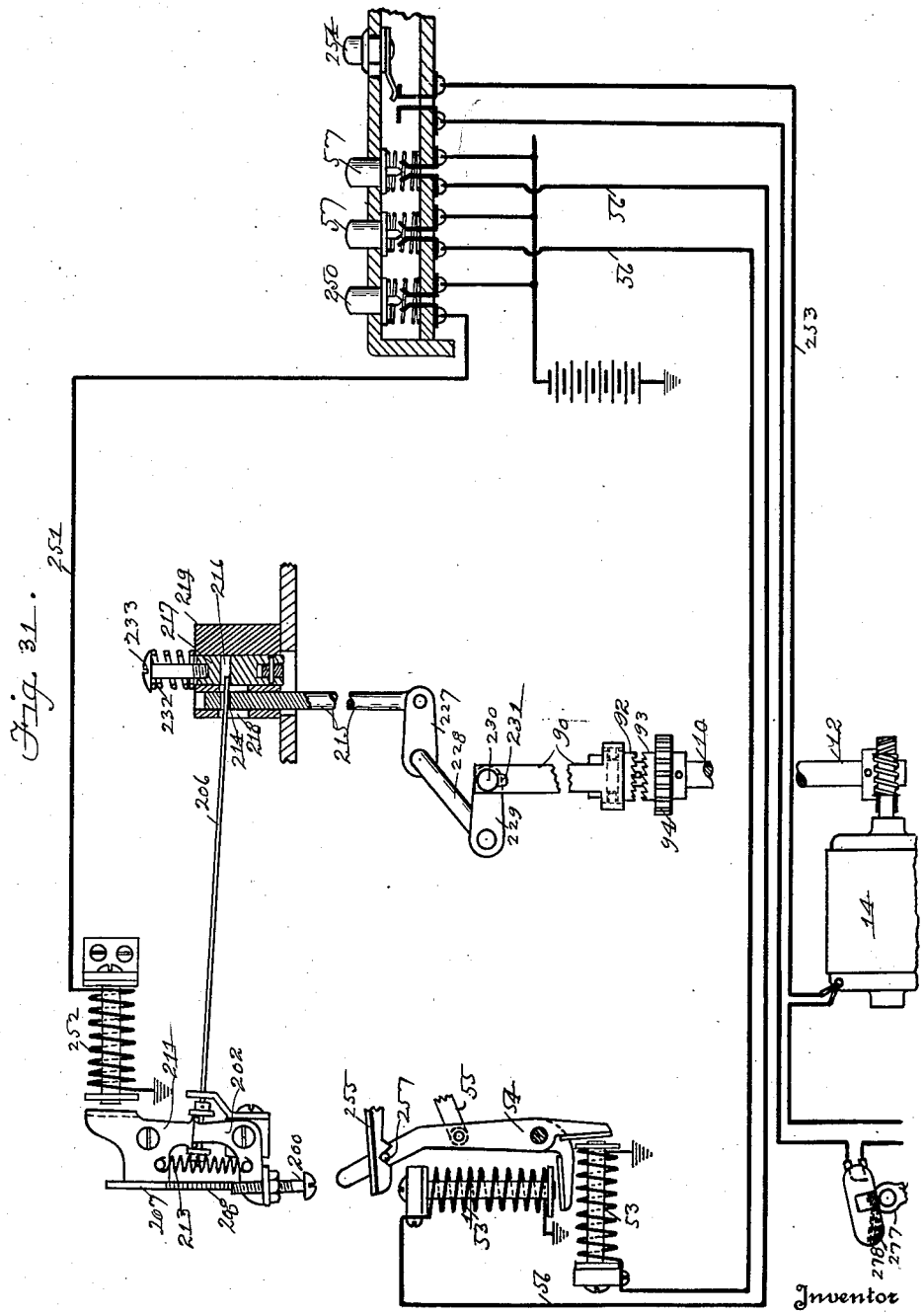

Patented Dec. 22, 1936

2,064,868

UNITED STATES PATENT OFFICE 2,064,868

GRAPHOPHONE OR SOUND-REPRODUCING INSTRUMENT

Harry A. Yeider, Grand Rapids, Mich., assignor to Automatic Musical Instrument Company, Grand Rapids, Mich., a corporation of Delaware Application September 18, 1930, Serial No. 482,662

18 Claims. (Cl. 274—10)

The present invention relates to graphophones or sound-reproducing instruments; and its object is, generally, to provide such an instrument improved in respects hereinafter appearing; and more particularly, to provide an instrument of that character having improved means for initiating the operation thereof; and further, to provide in such an instrument improved means for transferring any one of a plurality of record disks to and from the turntable of the instrument; and further, to provide in such an instrument improved means whereby either of the records on the opposite sides of any record disk may be selected to be played; and further, to provide in such an instrument improved means for moving its tone arm into and out of operative relation with the record disk on the turntable; and further, to provide in such an instrument improved means whereby record disks whose grooves have spiral or undulating ends may be played; and further, to provide in such an instrument improved means for playing record disks of different diameters; and further, to provide in such an instrument an improved holder or rack for the disk records; and further, to provide in such an instrument improved means for effecting the operation of the parts of the instrument in ordered sequence and for reversing the movements of, or for returning to initial positions, said parts for subsequent operations of the instrument; and further, to provide in such an instrument improved mechanical connections and motion-transmitting mechanisms and arrangements thereof whereby the parts may operate in ordered sequence.

These and any other and more specific objects hereinafter appearing are attained by, and the invention finds preferable embodiment in, the mechanical and electrical organization and devices therein hereinafter particularly described in the body of this specification and illustrated by the accompanying drawings forming a part hereof, in which:

Figure 1 is a front elevational view of main parts of a graphophonic instrument;

Fig. 1a is a sectional view of the reciprocating drive mechanism shown in Fig 1.

Figure 2 is an axially sectional view thereof taken on a vertical plane corresponding to line 2—2 of Figure 1;

Figure 3 is a detail side view of certain parts of the same, a driving shaft being sectioned on line 3—3 of Figure 1;

Figure 4 is a detail vertical sectional view of certain parts of the instrument taken on line 4—4 of Figure 2;

Figure 5 is a front elevational view (enlarged) of parts shown in Figure 4 and of other parts seen in Figure 1;

Figure 6 is a top plan of parts shown in Figure 5, partially sectioned horizontally on line 6—6 of that view;

Figure 7 is an inner side elevational view of parts of the instrument partially sectioned vertically on line 7—7 of Figures 1 and 8;

Figure 8 is a vertical sectional view of parts shown in Figure 7 taken on line 8—8 of that view;

Figure 9 is a like view of some of said parts shown in a different position;

Figure 10 is a vertical sectional view of parts shown in Figure 8 taken on line 10—10 thereof;

Figure 12 is a like view of some of said principal parts, certain record-transferring parts being axially sectioned on line 12—12 of Figures 1 and 13;

Figure 13 is an outer side elevational view of said record-transferring parts seen at the right-hand side of Figures 1 and 11 and shown axially sectioned in Figure 12;

Figure 14 is a sectional view of said record-transferring parts taken on line 14—14 of Figures 1 and 15;

Figure 15 is a vertical sectional view of said parts and other parts taken on line 15—15 of Figures 12, 13 and 14, and showing a rack or record holding device and records therein;

Figure 16 is a top plan view of tone arm-moving means partially sectioned on line 16—16 of Figures 2 and 18;

Figure 17 is a detail side view of portions of said means, including parts operated by records of different diameters;

Figure 18 is a fragmentary detail side view of rotatable parts seen in top plan in Figure 16;

Figure 19 is a plan view of means for actuating the record-transferring means, partially sectioned on line 19—19 of Figures 1 and 20;

Figure 20 is a vertical sectional view of parts seen in Figure 19 taken on line 20—20 thereof;

Figure 21 is a sectional view of some of said parts taken on line 21—21 of Figure 19;

Figure 22 is a sectional view of others of said parts taken on line 22—22 of Figure 19;

Figure 23 is a fragmentary top plan view of certain parts shown in Figure 11 and overlying parts shown in Figure 16 partially broken away;

Figure 24 is a vertical sectional view of certain parts seen in Figures 16 and 23 taken on line 24—24 of said views;

Figure 25 is a vertical sectional view of said parts and adjacent parts taken on line 25—25 of Figure 23;

Figure 26 is a vertical sectional view of other parts, shown in Figures 11, 16 and 23 taken on line 26—26 of Figure 23;

Figure 27 is a sectional view of record gripping jaws and other parts of the record-transferring means taken on line 27—27 of Figures 1 and 15;

Figure 28 is a view of portions of the same viewed from one side of Figure 27;

Figure 29 is a vertical sectional view of a record-holding rack with records therein and operating parts, taken on line 29—29 of Figure 15;

Figure 30 is a side view of a record-engaging device of the rack; and

Figure 31 is a view, somewhat diagrammatic in character, of certain mechanical parts and devices of the organization or instrument and certain electrical operating and controlling means therefor comprising electric circuits and instruments therein, one of said mechanical devices being shown in section taken on line 24—24 of Figures 16 and 23.

Figure 11:
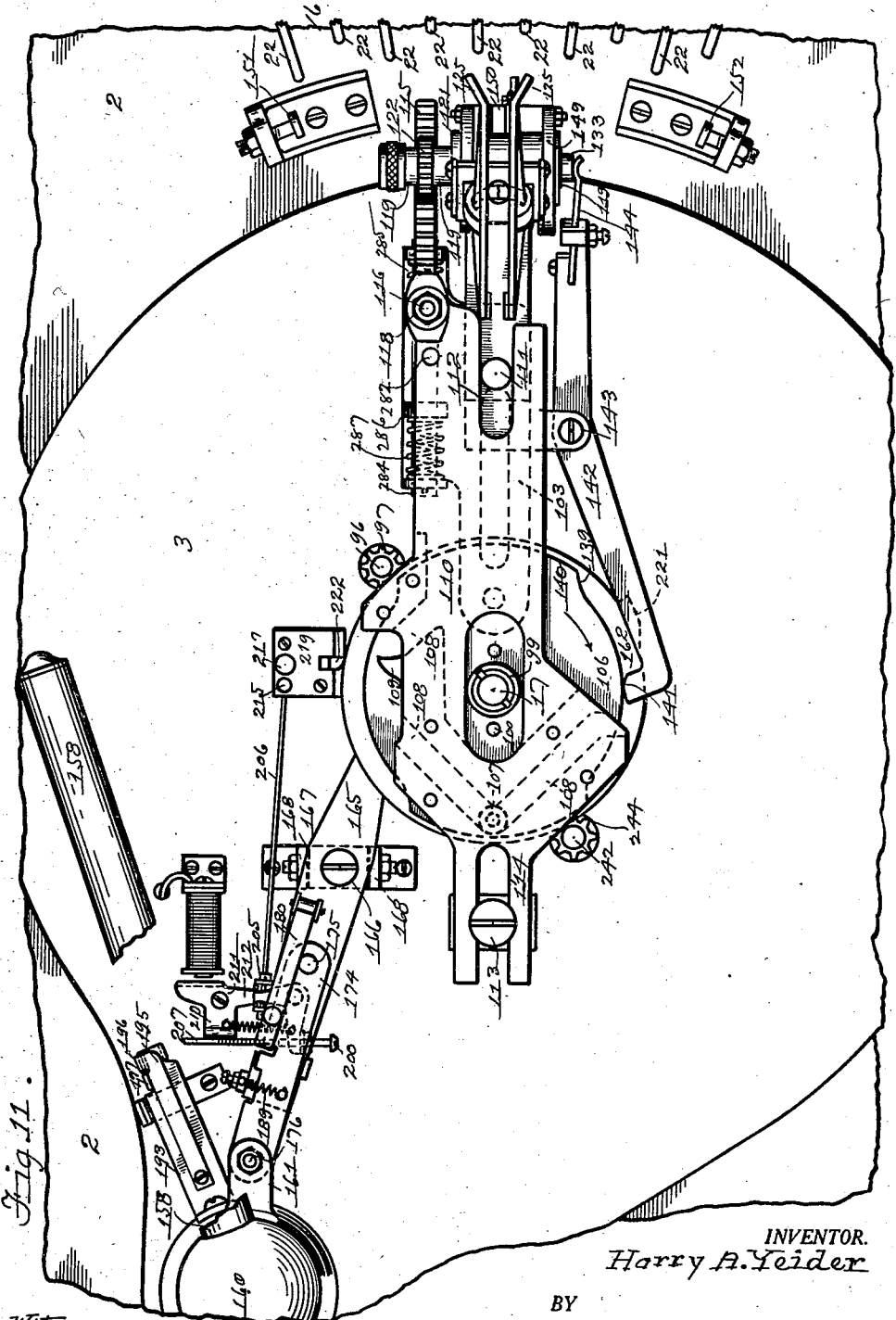
Figure 11 is a top plan view of principal parts of the instrument, certain parts being broken away and the record carrying turntable being removed.

The embodiment of the invention illustrated by these drawings is a sound-reproducing instrument or graphophone whereby any selected one of a plurality of circular disk records of different diameters may be transferred to the graphophone's turntable and "played" thereon, or either selected side of a double record may be played, whereupon the record disk is returned to its original position in a rack or holder, such selection being independent of the order in which the disks are arranged in the rack.

The illustrated mechanical and electrical organization, and the operation thereof, are as follows:

Referring now particularly to Figures 1 and 2, the base or frame 1 of the structure has a horizontal top 2 and a platform 3 parallel therewith and rotatable in alternately opposite directions on supporting rolls 4 about a vertical axis concentric with the record-carrying turntable 5.

Excepting for the driving motor and its connections and the record-holding rack designated generally 6, this platform carries the operating mechanism and devices, some of which are supported above the platform and others suspended below it extending downwardly through a circular opening 7 in the top 2 of the frame. The side 8 of this opening forms a circular track for the platform's rollers 9 which assist in maintaining the platform in axially vertical rotative position.

This platform and all the parts carried thereby may be lifted and removed entirely from the base or frame of the structure (for making repairs and replacements or other purposes), the machine's vertical main shaft 10 being removably seated in a socket 11 in the upper end of its coaxial driving shaft 12 (rotated as by an electric motor indicated at 14 in Figure 31), this shaft 10 being turnable in said socket against a spring-pressed member 13 engaging its flattened side, in case a stoppage occurs in the driven mechanism. The turntable is keyed at 18 to a shaft 17 aligned with the main shaft 10, and a circular box 19 contains a coiled flat spring 15 whose inner end is fastened at 16 to said shaft 17 and whose outer end frictionally contacts the curved inner side 20 of the box which is secured at 21 to main shaft 10. Thus the turntable is yieldingly driven by this main shaft. The rack or record holder mounted on the top 2 of the structure and indicated generally 6 (to be particularly described hereinafter) is adapted to contain side by side and edge up a plurality of disk records 22, extending in the turntable's radial directions. Record-transferring mechanism mounted on the platform 3, and hereinafter particularly described, is brought by rotating the platform, into registration with the particular record (in the rack) selected for playing, the particular record side (of a double record) selected for playing being governed by the rotation of the platform in one direction or the other. This platform is rotated for this purpose by the following mechanism, referring now to Figures 1, 2, 3, 4:

A shaft 23 has teeth forming a pinion 40 near its outer end meshing with a continuously toothed endless rack 24 mounted on the downwardly extending bracket 25 which is secured to the structure's top 2 and is curved in a horizontal plane concentrically with the platform's axis of rotation.

The teeth of this rack extend (as seen in Figure 1) along its opposite (upper and lower) sides, for rotating the platform in opposite directions, and around the end portions connecting said sides. Said shaft 23 bears turnably and also laterally-slidably in a vertical slot 26 through the downwardly extending arm 27 of the platform 3. As shown in Fig. 1 the rack 24 is centrally mounted in an oblong recess 25a formed in the face of the stationary bracket 25; and the shaft 23 has a reduced end portion 23a which remains in contact with the walls of the recess and thus holds the teeth of the pinion 40 in mesh with the teeth of the rack. This causes the pinion 40 to travel around on the rack as the shaft 23 is rotated, and move the platform back and forth through the connection of the depending arm 27, secured to the turntable, in which the shaft is vertically guided. To render this shaft sufficiently flexible, its inner end has a head 28 through whose angularly spaced bores 29 slidably bear the pins 30 projecting from the side of a gear 31 meshing with and driven by a gear 32 on shaft 33 carrying the bevel gear 34 meshing with and driven by the gear 35 on the main shaft 10. The head 28 and gear 31 are pressed apart by springs coiled around the pins 30.

The clutch members 36, 37 on shaft 33 (see Figure 5) being engaged, the platform 3 is oscillated by the main shaft 10 in alternately opposite directions (depending on whether the gear 40 of shaft 23 is meshing with the teeth of the upper or the lower side of the rack 24 at the time) until stopped in registration with the particular record (or the particular side thereof) in the record rack which has been selected for playing. This stopping of the platform's turning movement is effected by the following mechanism:

The gear 31 (see Figure 1) meshes with and drives gear 38 on shaft 39 whose worm 41 meshes with a worm gear 42 on a shaft 43. This shaft (see Figures 7, 8, 9) carries a cylindrical drum composed of a plurality of circular disks 44 (twenty in the shown construction, being one disk for each record side of each disk record in the record rack) disposed side by side, and separated by spacer disks 45, having radially extending flanges 46. The disks 44 have radially projecting lugs 47 respectively, angularly spaced uniformly as indicated in Figure 8.

Triggers 48 having slots 49 through which passes a horizontal bar 50 having a turning and also a vertically sliding movement thereon guided between the flanges 46, said triggers being associated with and actuated by the disks 44 respectively. The gear ratios between the means for rotating the platform 3 and the means for rotating the disks 44 is such that the particular trigger is actuated at the proper time (by its disk 44) which corresponds with the particular record selected for playing and into registration with which the platform is turned. The selecting mechanism includes the following parts operating in the following manner:

The particular trigger corresponding to the selected record disk (or the selected side thereof) is moved from its position shown in solid lines to that seen in dotted lines (Figure 8) wherein it is engaged by the lug 47 of the corresponding disk 44 and is thereby moved against the pressure of a spring 98 downwardly and outwardly (and out of such engagement) by the camming action of its inclined inner edge 51 on the horizontal rod 52, whereupon spring 98 raises the trigger to its original (solid line) position. The triggers are selectively moved to their dotted line positions (for engagement with the lugs 47) by suitable selecting means.

Such means in the illustrated construction comprises electromagnets 53, 53¹ (one magnet for each trigger) whose armature levers 54, fulcrumed on a horizontal rod 58, are connected by links 55 to the triggers respectively (Figures 8 and 10) whose magnets are in electric circuits 56 respectively having switches or buttons 57 for opening and closing the same (Figure 31). These triggers straddle at 59 the horizontal rod 60 (being held apart by spacers 61) carried by one arm 62 of a lever fulcrumed at 64, so that when any trigger is forced downwardly by the engaging lug 47, it swings this arm and the lever's parallel other arm 66 down against the pressure of spring 65, thus carrying the double-sided catch 67 (pivoted at 68 on arm 66) downwardly far enough to permit spring 70 to turn the upper end of this catch's middle portion 71 into a position beneath the free end of a lever arm 72 (as seen in Figure 5), whereupon spring 65 raises arm 66 and catch 67 and lifts arm 72, thus releasing its shoulder 73 from the upwardly extending part 74 of a horizontal bar 75 slidably mounted at 76 on another slidable horizontal bar 77. Thus released, bar 75 is slid by its spring 78 toward the right hand side of Figures 1, 5 and 6 causing its inclined right hand end 79 to cam on the under edge of a lever catch 80 whose other end 81 has been engaging the lower end of a lever 82 fulcrumed at 83 and having a fork 84 connected with clutch member 36. The spring 85 instantly swings lever 82 to the position shown in Figure 5 disengaging the clutch members 36, 37 and stopping the rotation of the platform 3 in the position wherein the record-transferring mechanism thereon stops in registration with the disk record in the rack selected for playing. The parts are now in position for the record-transferring mechanism to transfer the selected record from the rack to playing position on the turntable. This mechanism is as follows and is operated in the following manner and by the following means:

The said movement of lever 82 draws the inclined portion 86 of a horizontal bar 87 (connected at 88 to this lever) from supporting engagement with a pin 89 on a vertically movable bar 90 thus permitting this bar to fall to the position seen in Figure 5 wherein its fork 91 connected to clutch member 92 causes it to engage clutch member 93 of an idler gear 94 on the main shaft 10.

It will be seen that clutch members 36, 37 cannot engage while clutch members 92, 93 are in engagement. The gear 94 meshes with gear 95 on a vertical shaft 96 having the gear 97 of a composite element comprising cam disks shown in Figures 11, 12, 16, 19 and 23, and in assembled side by side position in Figures 1 and 2 in which assembled position they are pinned together at 100 and rotate as one element about an upstanding hollow post 99 on the platform 3 in which post the turntable's shaft 17 rotates.

For the playing of each record these cam disks make one complete revolution, during a part of which the transferring mechanism is operated thereby to transfer a record to the turntable and, after an inoperative interval (while the record is being played), said mechanism is operated reversely by the rotating disks to return the record from the turntable to its position in the rack. To accomplish these ends, the cam disks (turning in the direction indicated by curved arrows) have the following parts operating the following connections and in the following manner:

The lowest (the toothed) cam disk 98 (see Figures 2, 19 and 20) has in its under side a cam groove 101 in which travels a roller 102 pivoted on a flat wide bar 103 slidable radially of the platform 3 in a bearing 104, etc. On an upward extension 105 of platform 3 is mounted the record gripping jaws and certain operating parts therefor. The uppermost cam disk 106 (see Figures 2, 11 and 12) has a roller 107 which travels in a cam groove 108 in the plate 109 fastened to the under side of another wide flat bar 110 (slidable relatively to and parallelly with bar 103) whose post 111 bears in a slot 112 of bar 110, a screw post 113 of the platform 3 bearing in slot 114 of bar 110 in the relative sliding movement of these bars This upper bar 110 carries at its outer end a toothed rack 115 vertically yieldingly mounted on a threaded post 116 surrounded by a spring 117 whose tension is adjusted by the post's nut 118. On the outer end of the upward extension 105 of the platform 3 are spaced ears 121 having aligned bearings 120 in which a hollow member 119 is turnable through about 180 degrees. (See Figures 1, 11, 12, 13, 14, 15, 27 and 28). This hollow member 119 has a gear 122 with which the toothed rack 115 meshes to turn it, and carries between said ears a hollow member 127 turnably mounted at 123 about an axis transverse to the axis of member 119. This hollow member 127 has at its outer end spaced arms 124 on which the record-gripping jaws 125 are pivotally mounted at 126 respectively.

A rod 128 is slidable in this hollow member 127 so that its conical outer end presses between and separates (against the pressure of springs 129) the inner arms of said jaws to press their outer arms 130 into gripping engagement with a record disk therebetween. This rod 128 has diagonal teeth 131 with which mesh the diagonal teeth 132 of a rod 133 slidable in hollow member 119, so that the sliding movement of rod 133 moves rod 128 radially inwardly or outwardly. The movement of roller 107 in cam groove 108 of bar 110 (see Figures 11 and 12) slides this bar and by its rack 115 (meshing with gear 122 of hollow member 119) turns the said member and the separated gripping jaws from the position seen in Figures 1 and 11 and in solid lines in Figure 15 to the position shown in dotted lines in Figure 15, wherein they straddle the selected record disk 22 in the rack. The roller 107 now passes out of cam groove 108 so that bar 110 remains stationary, and immediately the turning of cam disk 106 brings the rise 139 of its peripheral cam 140 to the inturned end 141 of a lever 142 fulcrumed at 143 on the upward extension 105 of platform 3 and moves the leaf spring 144 at the opposite end of this lever into pressing engagement with the end of rod 133 and yieldingly slides it against the pressure of a spring 134 thus causing rod 128 to slide outwardly and press the gripper jaws' end portions 130 on the record disk between them. The roller 107 now passing into the opposite end of its cam groove 108 slides bar 110 inwardly so that its rack 115 rotates the hollow member 119 reversely, thus raising the record disk from the rack and moving it toward the turntable. During this movement however the record's side selected for playing is turned upwardly in its passage from the rack to the turntable, and by the following mechanism:

The hollow member 127 has a gear or toothed sector 145 (see Figures 14, 27 and 28) which is brought into mesh with one or the other of a pair of inwardly-facing spaced-apart toothed sectors 146, 147 on the spaced sides 148, 149 respectively of a member 150 bearing slidably on the ears 121, so that when sector 146 is by the sliding movement of member 150 brought into mesh with sector 145 the hollow member 127 is turned in one direction, but when sector 147 is moved into mesh with sector 145 said hollow member is turned in the opposite direction, during the transferring movement of the record disk. The sector 145 is brought into mesh with sectors 146, 147 respectively by the following means:

The top 2 of the structure has angularly spaced threaded stops 151, 152 marking the limits of the oscillation of the platform 3. On the upward extension 105 of platform 3 is pivotally mounted at 153 a catch 154 whose swinging movement is limited by screw stops 155. (See Figure 13.) A spring 156 extending between this catch and the member 150 causes said member to slide one way or the other depending on which way the catch is turned on its pivot 153. If the platform 3 be turning toward stop 151 or 152 when the selection of the record-side to be played is made, one of the catch's extensions 157 will strike that stop and turn or trip catch 154 so as to slide member 150 in the direction which will turn hollow member 127 in the right direction to deposit the record disk on the turntable with its selected side up in position for playing.

Immediately the record has been transferred to the turntable for playing, the tone arm 158 is moved to engage its needle or stylus 159 in the beginning of the record's groove. (See Figures 1, 11, 16, and 23.) The tone arm is mounted on platform 3 turnably about a vertical axis concentric with its supporting member 160, said member having a radial arm 161. The tone arm is also movable vertically a sufficient distance to raise the stylus from the record disk and to lower it thereto, by the following mechanism:

The cam disk 162 has in its upper side a cam groove 163 in which travels a roller 164 on the inner end of a lever 165 fulcrumed on a vertical pivot pin 166 carried by a member 167 pivoted at 168 on the platform 3 to turn about a horizontal axis, so that this lever swings horizontally during the playing of the record by the travel of the stylus in the record groove, and also may be swung vertically to a slight degree to lower the stylus into said groove at the beginning of the playing and to raise the same therefrom at the end of the playing of the record. (See Figures 16 and 23.) The inner end of this lever 165 is normally held in lowered position (to raise the stylus) by the travel of its roller 169 on the long dwell 170 of a cam disk 171 (see Figure 18) fastened on the under side of the cam disk 106, but is permitted to rise (to lower the stylus) by the passing of this roller into the dip 173 of cam disk 171. The lever 165 is connected to arm 161 of the tone arm by a bar 174 pivoted at 175 on this lever 165 and at 176 on arm 161, so as to have (in case a large-diameter record disk is being played as hereinafter described) a slight horizontal movement relatively to its said connected parts. As shown in Figures 1 and 17 this bar 174 at its outer end bears on the convex portion 178 of the vertically adjustable pivot post 176 to hold the tone arm raised.

Mechanism is provided whereby the graphophone is adapted to play record disks of different diameters, such as the ten-inch and the twelve-inch records seen in Figure 15, and to lower the stylus into the beginning of the groove of the record disk (of whichever diameter) on the turntable, which mechanism is described and operates as follows:

When the smaller-diameter (ten-inch) record disk is played, the lever 165 and bar 174 swing together as one; but when the larger-diameter (twelve-inch) record disk is laid on the turntable to be played, its edge extending beyond the edge of the turntable (as shown in dotted lines in Figure 17) contacts the upper end of a post 179 carried by the lever arm 180 pivoted at 181 on lever 165 and presses this lever arm downwardly. The leg 182 of arm 180 thus contacts the short arm 183 of a latch 184 loosely mounted at 185 on the under side of bar 174 moving said short arm below and out of holding abutment with a stop 186 on the under side of lever 165. As a result of this operation the lever 165 is swung by the travel of roller 164 in groove 163 without swinging the bar 174 with it (and without turning the tone arm from its outermost position), this bar 174 turning on its pivotal connections 175, 176 until the upward projection 187 of lever 165 strikes the edge 188 of bar 174, whereupon the lever 165 and bar 174 swing together and the tone arm is swung thereby to a position in which the stylus is over the beginning of the groove of the large diameter record and ready to be lowered thereunto. It will be seen that by this mechanism the stylus is in lowering position at a greater radial distance from the turntable's axis for a large-diameter record than it is for a record of small diameter which does not project far enough to rest on the upper end of post 179.

A spring 189 mounted at 190 on lever 165 and at 191 on bar 174 urges them to parallel position. The stylus being now lowered into the outer end of the groove of the record disk (of either diameter) by the riding of roller 169 up into dip 173, and the rotation of the cam disks (including cam disk 162) ceasing, the record is played and roller 164 moves inwardly (toward shaft 17) in the enlarged dwell 192 of cam groove 163. When the cam disk 162 was rotating before the playing of the record, its peripheral cam 221 engaged the arm 222 of a bell crank lever 223 fulcrumed at 224 in a block 219 on the platform 3 (see Figures 2, 16, 23, 24, and 25). The other arm 225 of this lever connected at 226 to a member 217 has thus slid said member downwardly (against spring 232) in its bearing in said block so that the end portion 220 of a long rod 206 extending through an opening 214 of a vertical rod 215 is in position to enter a hole 216 of said member, whereupon said end portion is inserted into said hole by the pressure of a spring 213 whose action is hereinafter fully explained. The arm 222 of lever 223 passing off of cam 221 allows spring 232 to raise member 217 and said end of rod 206 with it, thus raising rod 215 and disengaging clutch members 92, 93 (see Figure 31, etc.) and causing the rotation of the cam disks to cease during the playing of the record. As the tone arm is turned, its arm 193 (see Figures 11, 16, 23 and 26) moves with it. This arm has loosely mounted at 194 thereon an arm 195 movable vertically and guided by the upward extension 197 of arm 193. This arm 195 has a downward tongue 196 adapted to bear in the vertical movement of said arm on the downward extension 198 of arm 193, and arm 193 has a downward tongue 199.

As the tone arm swings to end the playing of a record whose stylus groove terminates spirally in the middle of the record, the tongue 199 strikes the end of a screw 200 threaded for adjustment in the arm 201 of a bell crank lever 202 whose other arm 203 engages between stops 204, 205 of the long horizontally slidable rod 206; but if the stylus groove of the record being played terminates undulately in the middle of the record, the tongue 196 of arm 195 rides up an incline 207 (raising this arm) and slips over the ratchet teeth 208 of a horizontal bar 209 on the arm 210 of another bell crank lever 211 whose other arm 212 also engages between the stops 204, 205.

In either case, the lever arms 201, 210 are thus swung from each other against the pressure of the aforesaid spring 213, the other lever arms 203, 212 being thus moved into engagement with stop 204 and causing rod 206 to slide toward the left hand side of Figures 11, 16 and 23. By this movement the end portion 220 of long rod 206, (which during the playing of the record has been supporting the vertical rod 215 in raised position, see Figures 31, 23, 24 and 25), is withdrawn from the keeper hole 216 and falls in a vertical slot 218 until it rests on the bottom of this slot. Thus the vertical rod 215 is permitted (at the end of playing the record) to fall and in so doing swings downwardly the connected arm 227 of a shaft 228 (see Figures 31, 16, 2 and 1) and also this shaft's other arm 229 whose wrist pin 230 turns in the upper end of the vertical bar 90 which carries at its lower end the clutch member 92, and thus causes this clutch member to engage clutch member 93, so that the cam disks rotate again to reverse the action of the tone arm-moving means and then the action of the record-transferring means and return the record to its place in the rack.

This vertical bar 90 has a slot 231 in which wrist pin 230 moves, to permit the unclutching of these clutch members 92, 93 although arm 229 may be in the position seen in Figure 5. The bar 90, rods 215, 206 and member 217 being in lowered position wherein said clutch members 92, 93 engage to rotate the cam disk, the rod 206 resting on the bottom of slot 218 is slid (as above described) into keeper hole 216 by the spring 213 swinging the bell crank levers 202, 211 (see Figure 31, etc.). These rods 215, 206, member 217 and bar 90 are raised to the position seen in Figure 31 (thus disengaging clutch members 92, 93) by the aforesaid spring 232 surrounding an adjustable screw post 233 and bearing on block 219. The rotation of toothed disk 98 causes the cam 234 on its under side to engage and press downwardly the arm 237 of a lever 235 travelling in a groove 236, whose other arm is pivoted to a vertical bar 238 (see Figures 19, 20, 21 and 1) and thus raises this bar's lower end from the keeper notch 239 of horizontal bar 77 against the pressure of spring 240 (see Figures 1, 5 and 6). Thus released, this bar 77 is slid toward the right hand side of Figures 1, 5 and 6 by a spring 247. By this action lever catch 80 moves from its position seen in Figure 5 and its end 81 moves into engagement with the lower end of lever 82, and the left hand end 248 of arm 72 falls into engagement with the middle or web portion 71 of catch 67, and also the shoulder 73 of arm 72 falls into engagement with the upright extension 74 of bar 75. Thereupon the arm 241 of a vertical shaft 242 strikes the adjustable stop 243 carried by bar 77 and slides this bar toward the left hand side of Figures 1, 5 and 6, thereby turning the catch 67 and the lever 82 and moving the bar 75 to their positions seen in Figure 1 and causing the clutch members 36, 37 to engage, and also sliding bar 87 toward the left hand so that its inclined portion 89 disengages clutch members 92, 93.

In this left hand movement of bar 77, the horizontal bar 75 moving with it, tensions springs 78 and 247, and the vertical bar 238 drops into notch 239 of bar 77. The vertical shaft 242 is turned (to cause its arm 241 to strike and slide the bar 77) by the toothed cam disk 98 meshing with said shaft's gear 244.

The playing of a record may be stopped at any time by closing the button switch 250 in the electric circuit 251 containing a magnet 252 which, when energized, swings armature lever 211 to move rod 206 toward the left hand to thus allow clutch members 92, 93 to engage and cause the cam disks to rotate and return the tone arm and the record from the turntable to the rack (Figure 31). The circuit 253 to the motor 14 is opened and closed by a master switch 254.

The means for selecting the record (or record-side thereof) desired to be played, may manifestly be operated or controlled otherwise than by the means shown, as by coin-operated mechanism and the like. The armature levers 54 may be yieldingly held in swung position by suitable means, as the pivoted arms 255 whose notches 256 receive their pins 257 (Figure 8).

Any number of records may be selected at the same time for playing by closing the circuits 56 (by their button switches 57), and the records thus selected will be played in the order in which the lugs 47 corresponding thereto engage (by the turning of shaft 43) the corresponding triggers 48 respectively to operate the machine.

As seen in Figures 1, 5, 7, 8 and 10, the means for thus playing such selected records successively includes a horizontal bar 270 carried on the arms 271 of a lever fulcrumed at 272 and having another arm 273 engaging the lower arm 274 of a lever fulcrumed at 275 whose upper arm 276 is connected to the pivotally mounted support 277 of a mercury switch or circuit opener and closer 278 in the electric circuit 253 containing the motor 14 (see Figures 1 and 31). This switch being closed and said circuit being closed by the master switch 254 to operate the motor, and the button switches 57 corresponding to the records selected for playing being also closed, the action of the machine as hereinbefore explained causes the energized magnet 53, or 53¹ (corresponding to one of selected records) to swing its armature lever 54 to the dotted line position seen in Figure 8 whereupon the rotation of shaft 43 causes the corresponding lug 47 to engage its trigger 48 to initiate the playing of said record, this first record to be played thus corresponding to the first one of the lugs which by the turning of shaft 43 is brought into operative engagement with its trigger.

In the armature lever's movement to dotted line position (Figure 8) it contacts the horizontal bar 270 (which extends along all the armature levers in the same relation therewith) and thus swings arm 271 toward the dotted line position seen in Figure 8 and the other arm 273 toward the right hand side of Figure 1. This action swings lever arm 274 and thereby the mercury switch 278 to closed position, thus closing the main circuit 253 containing the motor (this circuit's master switch 254 being already closed).

The same movement of lever arm 273 carries its horizontal link 279 in the same direction, moving this link's stop 280 so that the lever arm 67 may turn from its position shown in Figure 1 to that seen in Figure 5, and so that the actions hereinbefore described may follow in the playing of the record.

The first one of the series of selected records having been played, the others so selected are (as above stated) played successively and in the order in which the lugs 47 corresponding thereto are brought by the rotation of shaft 43 into engagement with their triggers 48 respectively. The operating parts 67, 72, 75, etc. remain in the position shown in Figure 5 during the playing of all the records thus selected; and when the playing of the last one of said series is completed, these parts are moved, as hereinbefore explained, to initial position, during which movement the spring 281 draws arm 273 toward the left hand side of Figure 1 and opens the mercury switch 278, and also moves the horizontal bar 270 to its solid line position seen in Figure 8 wherein it engages all the armature levers 54 in their solid line position shown in that view. These armature levers may be locked in that position by a horizontal bar 282 engaging them and carried by the arms 283 of a lever fulcrumed at 284 whose other arm 285 may be locked by suitable means to the part 286 (see Figures 1 and 10).

The record disks 22 (of larger and smaller diameters) are held in the rack designated generally 6 with their central holes in registry with each other. This rack, as shown in Figure 29, comprises a plurality of compartments—one for each record disk—formed by spaced upright plates 260, 261 receiving the record disk therebetween.

A horizontally disposed record-supporting member 262 is moved in its longitudinal direction through the hole 263 in one (260) of said plates and into the central hole 264 of the record by the inserting movement of the record into its compartment. This member 262 is formed at one end of a lever or rock member 265 pivoted at 266 on said plate to swing in a plane at right angles thereto, and is pressed by a spring 267 to the position seen in the two right hand compartments in Figure 29; but when a record is inserted, the record engages the opposite end (which is a spring 268) and presses this rock member or lever 265 to move the supporting member 262 through the holes 263 and 264 as seen in the two left hand compartments in this view, thus supporting the records with their holes 264 in a level line curved concentrically about the turntable's axis.

As the upper bar 110 is forced radially outwardly its lug 282 (Figures 19, 20) engages the collar 283 sliding on the rod 284 and compresses a coiled spring 285; and as said bar is forced inwardly said lug engages the sliding collar 286 and compresses coiled spring 287; so that in either case this bar when permitted to return to medial position is assisted in such movement by the compressed spring.

The invention being intended to be pointed out in the claims, is not to be limited to or by details of construction and arrangement of any particular embodiment thereof illustrated by the drawings or hereinbefore described.

What is claimed is:

1. In a graphophone instrument: a base frame; driving mechanism, a holder for disc records in laterally spaced relation, and a record-supporting turntable, carried by the frame; a platform mounted turnably on the frame; a transferrer mounted on the platform and turnable therewith for carrying a selected record between the holder and the turntable; a movable arm mounted on the platform having a stylus; means mounted on the platform for operating the transferrer; means mounted on the platform for moving the arm and its stylus relatively to the turntable; connections between the driving mechanism and the transferrer-operating means for actuating the same; connections between the driving mechanism and the arm-moving means for actuating the same, the platform being turnable to positions bringing the transferrer into operative registration with selected records respectively in the holder.

2. In a graphophone instrument: a base frame; driving mechanism, a holder for disc records in laterally spaced relation, and a record-supporting turntable, carried by the frame; a platform mounted turnably about a vertical axis on the frame removable therefrom in the direction of said axis; a transferrer mounted on the platform and turnable therewith for carrying a selected record between the holder and the turntable; a movable arm mounted on the platform having a stylus; means mounted on the platform for operating the transferrer; means mounted on the platform for moving the arm and its stylus relatively to the turntable; connections between the driving mechanism and the transferrer-operating means for actuating the same; connections between the driving mechanism and the arm-moving means for actuating the same, said connections comprising shafts in separable splined relation, the platform being turnable to positions bringing the transferrer into operative registration with selected records respectively in the holder.

3. In a graphophone instrument: a base frame carrying a holder for disc records in laterally spaced relation, and a record-supporting turntable; a platform mounted turnably on the frame; a transferrer mounted on the platform and turnable therewith for carrying a selected record between the holder and the turntable; a circuitous rack on the frame; a gear rotatably mounted on the platform and meshing with the rack for turning the platform to positions bringing the transferrer into operative registration with selected records respectively in the holder.

4. In a graphophone instrument: a base frame carrying a record-supporting turntable and a holder for disc records in laterally spaced relation; a platform mounted turnably on the frame; a transferrer mounted on the platform and turnable therewith for carrying a selected record between the holder and the turntable; a circuitous rack on the frame; a gear rotatably mounted on the platform and meshing with the rack for turning the platform to positions bringing the transferrer into operative registration with selected records respectively in the holder; record-selecting mechanism for moving the gear to a position on the rack registering the transferrer with the selected record.

5. In a graphophone instrument: driving mechanism therefor; a record-supporting turntable; an arm having a stylus and turnably mounted for horizontal and vertical movement to carry the stylus into and out of operative engagement with a record on the turntable; a lever swingable by said mechanism, fulcrumed for horizontal and vertical movement and comprising an arm with an extension pivoted thereto and engaging the stylus arm to move the same; a releasable catch for holding the lever arm and its extension in relatively turned position; means operated by the pressure thereon of the record on the turntable for releasing the catch.

6. In a graphophone instrument: driving mechanism therefor; a record-supporting turntable; an arm having a stylus and turnably mounted for horizontal and vertical movement to carry the stylus into and out of operative engagement with a record on the turntable; a lever swingable by said mechanism, fulcrumed for horizontal movement and comprising an arm with an extension pivoted thereto and engaging the stylus arm to move the same; a releasable catch for holding the lever arm and its extension in relatively turned position; means operated by the pressure thereon of the record on the turntable releasing the catch.

7. In a graphophone instrument: a base frame having a circular track and a holder for disc records in laterally spaced relation; driving mechanism carried by the frame comprising a vertical shaft concentric with the track; a horizontal platform turnably bearing on the track; a record-supporting turntable above the platform having a shaft coaxial and in detachably splined relation with the first-mentioned shaft; a transferrer mounted on the platform for carrying a selected record between the holder and the turntable; a movable arm having a stylus mounted on the platform; means mounted on the platform for operating the transferrer; means mounted on the platform for moving the arm and its stylus relatively to the turntable; connections between the driving mechanism and the transferrer-operating means for actuating the same; connections between the driving mechanism and the arm-moving means for actuating the same, each of said actuating means comprising detachable parts carried by the frame and the platform respectively, the platform being turnable to positions bringing the transferrer into operative registration with the records respectively in the holder, and the platform with the turntable being removable from the frame in the direction of said shafts.

8. In a graphophone instrument: a base frame; driving mechanism; a holder for disc records in laterally spaced relation, and a record-supporting turntable, carried by the frame; a platform mounted turnably about a vertical axis on the frame, removable therefrom in the direction of said axis; a transferrer mounted on the platform and turnable therewith for carrying a selected record between the holder and the turntable; means mounted on the platform for operating the transferrer; connections between the driving mechanism and the transferrer-operating means for actuating the same; connections between the driving mechanism and the turntable for rotating the same comprising shafts in separable splined relation, means for turning the platform to positions bringing the transferrer into operative registration with selected records respectively in the holder.

9. In a graphophone instrument: a base frame having a circular track and a holder for disc records in laterally spaced relation; driving mechanism carried by the frame comprising a vertical shaft concentric with the track; a horizontal platform turnably bearing on the track; a record-supporting turntable above the platform having a shaft coaxial and in detachably splined relation with the first-mentioned shaft; a transferer mounted on the platform for carrying a selected record between the holder and the turntable; means mounted on the platform for operating the transferrer; connections between the driving mechanism and the transferrer-operating means for actuating the same, said actuating means comprising detachable parts carried by the frame and the platform respectively, the platform being turnable to positions bringing the transferrer into operative registration with the records respectively in the holder. and the platform with the turntable being removable from the frame in the direction of said shafts.

10. In a graphophone instrument: a base frame carrying a holder for disc records in laterally spaced relation and a record-supporting turntable; a transferrer turnable oscillatingly and parallelly with the turntable for carrying a selected record between the holder and the turntable; a circuitous rack on the frame at one side of the axis of the transferrer's turning movement; a gear rotatably mounted in connection with the transferrer and meshing with the rack for turning the transferrer to registering positions with selected records respectively in the holder.

11. In a graphophone instrument: a base frame member carrying a holder for disc records in laterally spaced relation and a record-supporting turntable; a transferrer member turnable oscillatingly and parallelly with the turntable for carrying a selected record between the holder and the turntable; a circuitous rack mounted in connection with one of said members at one side of the axis of the transferrer member's turning movement; a gear rotatably mounted in connection with the other one of said members. and meshing with the rack for turning the transferrer member to positions bringing the same into operative registration with selected records respectively in the rack.

12. An automatic phonograph comprising, in combination, a record magazine, a rotatable turntable, a mechanism for transferring a record disc from the magazine to the turntable and vice versa said mechanism and magazine being mounted for interrelative movement, a mechanism for effecting said movement comprising a rotatable pinion member and a cooperating endless rack member of oblong form elongated in the directions of said movement, one of said members being associated with the magazine in said movement, means for conditioning the disc transfer mechanism for placing the disc upon the turntable with a certain side up depending upon the direction of said movement just before stopping, and a reproducer for playing the disc.

13. An automatic phonograph comprising, in combination, a record magazine, a rotatable turntable, a mechanism for transferring a record disc from the magazine to the turntable and vice versa. said mechanism and magazine being mounted for interrelative movement, a mechanism for effecting said movement comprising a rotatable pinion member and a cooperating endless rack member of oblong form elongated in the directions of said movement, one of said members being associated with the magazine in said movement, means responsive to movement of the pinion relatively around the ends of the rack for conditioning the disc transfer mechanism for placing a disc upon the turntable with a certain side up, and a reproducer for playing the disc.

14. An automatic phonograph comprising, in combination, a record magazine, a rotatable turntable, a mechanism for transferring a record disc from the magazine to the table and vice versa said mechanism and magazine being mounted for interrelative movement, mechanism for effecting said interrelative movement comprising a rotatable pinion and a cooperating endless rack of oblong form elongated in the direction of said interrelative movement, said rack being associated with the magazine in said interrelative movement, means for guiding the pinion for movement only transverse to the relative movement of the rack, means for conditioning the disc transfer mechanism for placing a disc upon the table with a certain side up, said means being in response to a certain direction of transverse movement of the pinion, and a reproducer for playing the disc.

15. An automatic phonograph comprising, in combination, a record magazine, a rotatable turntable, a mechanism for transferring a record disc from the magazine to the table and vice versa said mechanism and magazine being mounted for interrelative movement, a mechanism for effecting said interrelative movement comprising a rotatable pinion and a cooperating endless rack of oblong form elongated in the direction of said interrelative movement, said rack being associated with the magazine in said interrelative movement, a rotatable, swinging shaft carrying the pinion at the free end thereof, means for guiding the shaft for swinging movement in a plane only at right angles to the direction of said interrelative movement, means for conditioning the disc transfer mechanism for placing a disc upon the table with a certain side up, said means being responsive to a certain direction of swinging movement of the pinion shaft, and a reproducer for playing the disc.

16. An automatic phonograph comprising, in combination, a record magazine, a rotatable turntable, a mechanism for transferring a record disc from the magazine to the table and vice versa said mechanism and magazine being mounted for interrelative movement, a mechanism for effecting said interrelative movement comprising a rotatable pinion and a cooperating endless rack of oblong form elongated in the direction of said interrelative movement, said rack being associated with the magazine in said interrelative movement, means for guiding the pinion for movement relatively around the ends of the rack, means responsive to a certain direction of relative movement of the pinion around the ends of the rack for conditioning the disc transfer mechanism for placing a disc upon the table with a certain side up upon the table, and a reproducer for playing the disc.

17. In a graphophone instrument: a turntable; a member for holding a plurality of disc records edge up side by side; a member for transferring a record between the records-holding member and the turntable, said members being mounted for interrelative movement in a plane parallel to the plane of the turntable to bring the transferring member into operatively registering position with any selected record in the records-holding member; mechanism for effecting said interrelative movement including a circuitous rack elongated in the direction of said movement carried by one of said members and a pinion journalled on the other one of said members meshing with the rack.

18. In a graphophone instrument: a turntable; a member for holding a plurality of disc records edge up side by side; a member for transferring a record between the records-holding member and the turntable, said members being mounted for interrelative movement in a plane parallel to the plane of the turntable to bring the transferring member into operatively registering position with any selected record in the records-holding member; mechanism for effecting said interrelative movement including a circuitous rack elongated in the direction of said movement carried by one of said members and a pinion journalled on the other one of said members meshing with the rack; means for guiding the pinion in its circuitous movement in mesh with the rack.

HARRY A. YEIDER.